United States Patent
Zuniga et al.

(10) Patent No.: US 8,208,454 B2
(45) Date of Patent: Jun. 26, 2012

(54) DETERMINING OPTIMAL LOCATIONS FOR WIRELESS ACCESS POINTS IN A WIRELESS NETWORK

(75) Inventors: Fabiel Zuniga, Roseville, CA (US); Rick Porter, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 557 days.

(21) Appl. No.: 12/432,584

(22) Filed: Apr. 29, 2009

(65) Prior Publication Data
US 2010/0278157 A1    Nov. 4, 2010

(51) Int. Cl.
*H04W 4/00* (2009.01)
(52) U.S. Cl. ......... 370/338; 370/336; 370/229; 370/308
(58) Field of Classification Search .................. 370/338, 370/336, 229, 308, 310, 328
See application file for complete search history.

(56) References Cited

U.S. PATENT DOCUMENTS

| | | | |
|---|---|---|---|
| 6,754,488 B1 * | 6/2004 | Won et al. | 455/424 |
| 6,922,405 B2 * | 7/2005 | Eikelenboom et al. | 370/338 |
| 7,069,024 B2 * | 6/2006 | Sharony | 455/456.1 |
| 7,555,260 B2 * | 6/2009 | Melkesetian | 455/11.1 |
| 7,664,511 B2 * | 2/2010 | Wang et al. | 455/456.1 |
| 7,783,300 B2 * | 8/2010 | Sinha | 455/456.1 |
| 2006/0019679 A1 * | 1/2006 | Rappaport et al. | 455/456.5 |

* cited by examiner

*Primary Examiner* — Ricky Ngo
*Assistant Examiner* — Dewanda Samuel

(57) ABSTRACT

A computer-implemented method for predicting signal coverage in a wireless network environment includes segmenting the wireless network environment into a plurality of zones, in which each one of a plurality of wireless communications devices operating in the wireless network environment is assigned to a corresponding one of the plurality of zones. The method continues with determining that a dependency exists between at least two signal reference relations from at least two of the plurality of zones and merging the at least two of the plurality of zones. The method concludes with adjusting the search space size for the optimal solution that predicts the signal coverage for the wireless network environment and locating at least one wireless access point within the wireless network environment based on the optimal solution.

13 Claims, 4 Drawing Sheets

DETERMINING OPTIMAL LOCATIONS FOR WIRELESS ACCESS POINTS IN A WIRELESS NETWORK

BACKGROUND

When designing a wireless network in an office, academic, or other environment, it is helpful to first construct a mathematical model of the site so that the selected locations for the wireless access points can provide efficient and reliable service to the various wireless clients in the network. When such modeling is not performed, the resulting layout may be over-designed, meaning that more wireless access points are included than are necessary. Another possibility is that the system may be underdesigned, which results in dead spots at which wireless services to clients is not possible.

DESCRIPTION OF THE EMBODIMENTS

In the exemplary embodiments of the invention described herein, predicting signal coverage in a wireless network increases the probability that wireless access points and clients can be optimally located within the wireless network environment. Previous attempts at locating wireless access points and clients have resulted in unwieldy and computationally-inefficient computer models that tend to overspecify the problem at hand. By attempting to characterize more elements of the environment than are necessary, a solution space much larger than necessary can result. With such a large solution space, employing even the most robust algorithms can result in inaccurate predictions of signal coverage.

Figure 1:
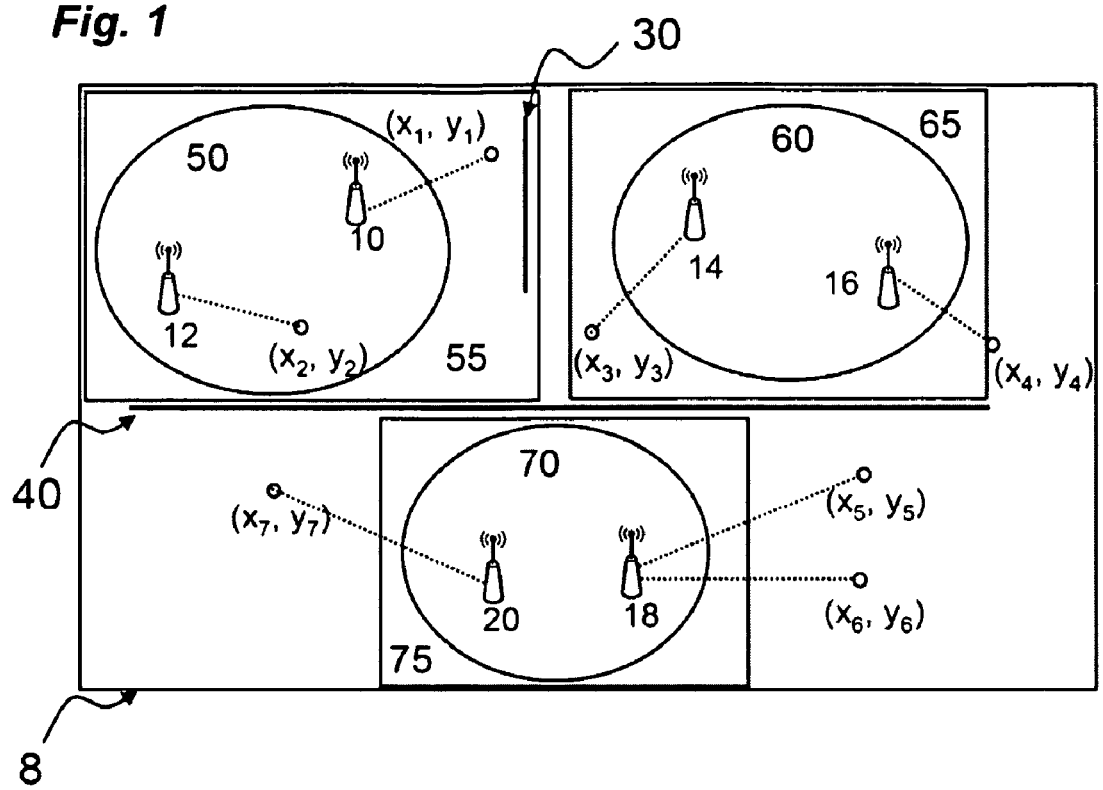
FIGS. 1-3 are exemplary layouts of wireless access points and other elements of an office environment according to an embodiment of the invention.

FIG. 1 is an exemplary layout of wireless access points and other elements of an office environment according to an embodiment of the invention. In FIG. 1, wireless network environment 8 includes wireless communications devices 10, 12, 14, 16, 18, and 20. In the embodiment of FIG. 1, wireless communications devices 10-22 represent wireless access points, cellular telephones with WiFi capability, laptop or desktop computers with wireless communications capability, or any other device capable of transmitting and receiving wireless signals.

At point $(x_1, y_1)$, the signal strength of wireless communications device 10 has been measured. In the context of the embodiment of FIG. 1, this is known as a signal reference relation. In like manner, at point $(x_2, y_2)$, the signal strength of wireless communications device 12 has been measured. At point $(x_3, y_3)$, the signal strength of wireless communications device 14 has been measured. At point $(x_4, y_4)$, the signal strength of wireless communications device 16 has been measured. At point $(x_5, y_5)$ and at point $(x_6, y_6)$, the signal strength of wireless communications device 18 has been measured. Finally, at point $(x_7, y_7)$, the signal strength of wireless communications device 20 has been measured. FIG. 1 also includes obstacles 30 and 40, which may be walls, partitions, pillars, doors, windows, or any other substantially solid metallic or nonmetallic object. It is contemplated that in between the wireless access points and the obstacles, air fills the remaining volume of the office environment. For the purposes of the embodiment of FIG. 1, this air-filled office volume is referred to as "free" space.

An area surrounding wireless communications devices 10 and 12 has been designated as zone 50. In like manner, an area surrounding wireless communications devices 14 and 16 has been designated as zone 60. Additionally, an area surrounding wireless communications devices 18 and 20 has been designated as zone 70. Finally, network environment 8 has been segmented into clusters 55, 65, and 75. The rationale for these zones and clusters is explained hereinafter.

In FIG. 1, it can be seen that none of wireless communications devices 10-20 possesses a signal reference relation that includes any one of obstacles 30 or 40. In accordance with this embodiment of the invention, this implies that obstacles 30 and 40 need not be characterized when predicting the signal coverage of wireless network environment 8. Thus, each of the zones in FIG. 1, the obstacles, the wireless communications devices, and the signal reference relation can be partitioned into smaller clusters. Accordingly, in the event that a genetic algorithm is used (although those of skill in the art are aware of many other parameter optimization techniques, such as a gradient search) the searching space size (which means the number of possible solutions) for this optimization algorithm to predict the signal coverage of each of clusters 55, 65, and 75 can be expressed as:

$$2^{(l_Z|Z'|+l_O|O'|)} \quad (1)$$

In which the variable and subscript "Z" refer to the path loss contribution of zones 50, 60, and 70, and the variable and subscript "O" refer to the loss contribution of obstacles 30 and 40.

Using a precision of 1, and an attenuation exponent value in the range of 2-6 for free space (of course, for pure free space in an absolute vacuum the attenuation exponent value should be 2.0) and an attenuation exponent value of between 2.0 and 15.0, the length of each variable can be found by the following relationship:

$$l = \lfloor \log_2 \lfloor (\max-\min) \cdot 10^{precision} \rfloor + 0.9 \rfloor$$

$$\text{chromosomeLength} = l_{z'}(|Z'|+|O'|)$$

$$\text{variablesCount} = |Z'|+|O'|$$

$$l_Z = 6, l_O = 7$$

Thus, equation (1) can be expressed as:

$$2^{(6\cdot 1+7\cdot 0)} = 2^6 = 64$$

This implies that since none of the signal reference relations include any one of obstacles 30 or 40, each cluster can be evaluated independently and the results summed. Thus, in this example of a genetic algorithm, the searching space size for each of clusters 55, 65, and 75 is 64. For the entire site shown in FIG. 1 the total searching space size is 192 (3×64).

Continuing with this example, each attenuation factor is decoded as:

$$decodedVariable_i = \min + \left[ \left( \sum_{j=i\cdot l}^{(i\cdot l)+i-1} chromosome[j] \cdot 2^{j-(i\cdot l)} \right) \cdot \left( \frac{\max - \min}{2^l - 1} \right) \right]$$

Thus, in this example, using a genetic algorithm with precision of 1, an attenuation exponent for zones 50, 60, and 70 that would be expected to be between 2 and 6 ("min" and "Zone- Max", respectively), and attenuation exponent for obstacles 30 and 40 being a value between 2 and 15 ("min" and "ObstacleMax"), the formula for the decoded variable would be:

$$decodedVariable_i = \begin{cases} min + \left[ \dfrac{\left( \sum_{j=\alpha}^{\alpha+l_Z-1} chromosome[j] \cdot 2^{j-\alpha} \right) \cdot}{\left( \dfrac{ZoneMax - min}{2^{l_Z} - 1} \right)} \right] & \text{if } i < |Z'| \\ min + \left[ \dfrac{\left( \sum_{j=\beta}^{\beta+l_O-1} chromosome[j] \cdot 2^{j-\beta} \right) \cdot}{\left( \dfrac{ObstacleMax - min}{2^{l_O} - 1} \right)} \right] & \text{if } i \geq |Z'| \end{cases}$$

$$\alpha = i \cdot l_Z$$

$$\beta = |Z'| \cdot l_Z + (i - |Z'|) \cdot l_O$$

Note how the above equation for the decoded variable permits the encoding of variables having different lengths.

In the embodiments herein, an objective function is used to minimize the mean and variance across all points within the wireless network environment. By minimizing the mean, it is most likely that the average distance between the predicted and measured signal strengths is as small as possible. By minimizing the variance, this also minimizes the number of outliers or other values that are well outside of the average. An exemplary objective function is shown below:

Objective Function$(c) = k_1 \sigma(c) + k_2 \mu(c)$ $$\sigma(c) = \frac{1}{|S|} \sum_{(r,x,y,s) \in S} (|s - P(r, x, y)| - \mu(c))^2 = \text{variance}$$

$$\mu(c) = \frac{1}{|S|} \sum_{(r,x,y,s) \in S} |s - P(r, x, y)| = \text{mean}$$

$$P(r, x, y) = s_0 - \text{attenuation}(r, x, y, dec(c, \text{zone}(r))) - \sum_{o \in O_{rxy}} dec(c, o)$$

Where $dec(c, \chi)$ decodes (i.e. acquires the phenotype) from the chromosome c the variable representing the attenuation factor to $\chi$. And, $S_0$ is the initial signal strength of the wireless communications device. Normally the sum of the wireless communication device's transmit power and the antenna gain if $(x_n, y_n)$ is inside of the antenna beam width area. Further, the constants $k_1$ and $k_2$ may be manipulated under particular circumstances in order to balance the contribution of the mean and variance to the objective function.

Figure 2:
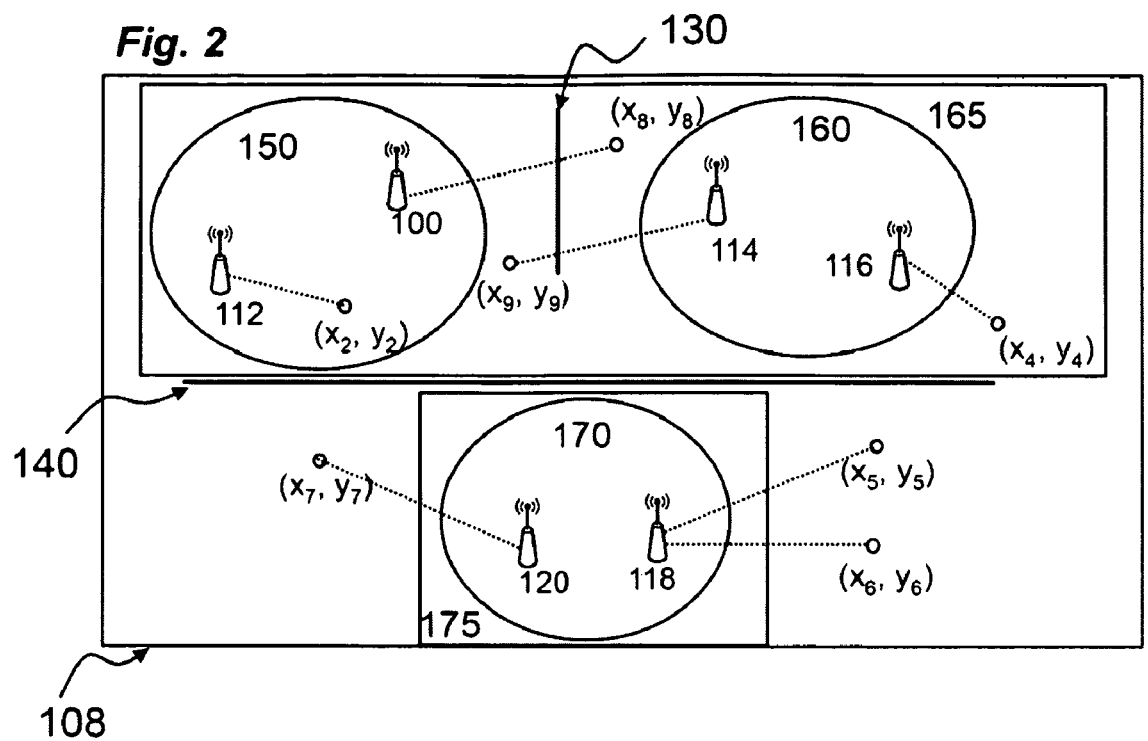

FIG. 2 is a second exemplary layout of wireless access points and other elements of the office environment according to an embodiment of the invention. In FIG. 2, wireless network environment 108 includes wireless communication devices 100, 112, 114, 116, 118, and 120. In the embodiment of FIG. 2, these wireless communications devices represent wireless access points, cellular telephones with WiFi capability, laptop or desktop computers with wireless communications features or any other device able to transmit and receive wireless signals.

As with points $(x_1, y_1)$ through $(x_7, y_7)$ of FIG. 1, the signal strengths of particular wireless communications device have been measured at points as shown by $(x_n, y_n)$ of FIG. 2. Two notable exceptions in the example of FIG. 2 are $(x_8, y_8)$ and $(x_9, y_9)$ which have been measured at a point behind obstacle 130 relative to the transmitting wireless communications device. Thus, in both instances, signals from the respective wireless communications devices must pass through obstacle 130. Because signals from wireless communications devices 100 and 114 must pass through the obstacle, zones 150 and 160 cannot be evaluated independently. Rather, these zones are considered as a single cluster (165) as opposed to being evaluated as separate clusters as discussed in relation to FIG. 1. Accordingly:

$$l = \lfloor \log_2 \lfloor (max-min) \cdot 10^{precision} \rfloor + 0.9 \rfloor$$

chromosomeLength = $l \cdot (|Z'| + |O'|)$ variablesCount = $|Z'| + |O'|$ $l_Z = 6, l_O = 7$ Thus, since one obstacle must now be considered equation (1) from the example of FIG. 1 would be expressed as:

$2^{(6 \cdot 2 + 7 \cdot 1)} = 2^{19} = 524,288$ is the searching space size for cluster 165. For cluster 175 (encompassing zone 170) the assumptions used in FIG. 1 still apply. Accordingly, the solution space for cluster 175 is still $2^6 = 64$.

Figure 3:
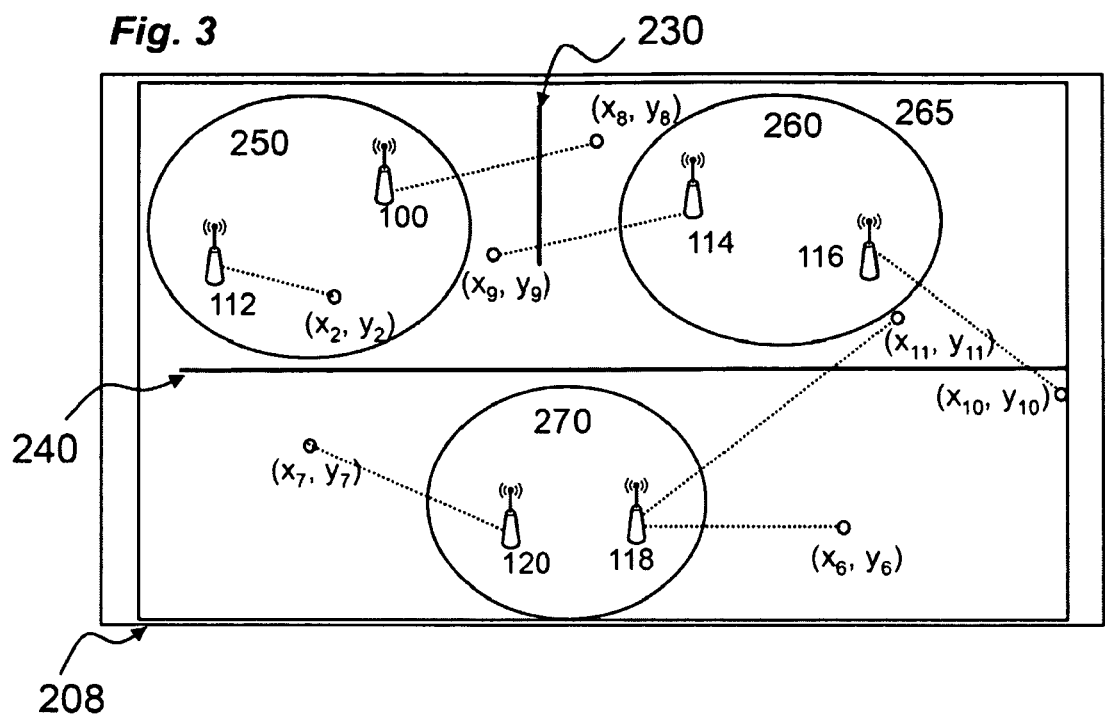

FIG. 3 is a third exemplary layout of wireless access points and other elements of the office environment according to an embodiment of the invention. The layout of FIG. 3 includes many of the same points used in the examples of FIG. 1 and FIG. 2, with the notable exceptions of new points $(x_{10}, y_{10})$ and $(x_{11}, y_{11})$, which are seen as passing through obstacle 240. Since the signal reference functions pass through obstacles 230 and 240, zones 250, 260, and 270 of wireless network environment 208 are aggregated into a single cluster (265). Accordingly, equation (1) of FIG. 1 would be expressed as:

$2^{(6 \cdot 3 + 7 \cdot 2)} = 2^{32} = 4,294,967,296$ is the searching space size of cluster 265.

Thus, it can be seen from the examples of FIGS. 1-3 that if the wireless network environment can be decomposed into clusters, the searching space size for the optimal solution for the placement of wireless access points to service the network environment. However, when computer models using a genetic algorithm and actual signal strength measurements are performed, it has been observed that the optimal solution using fewer clusters (having larger solution spaces) tends to be more accurate than optimal solutions that include several clusters each with smaller solution spaces. Accordingly, the optimal solution arrived at using the layout of FIG. 3 could be expected to be more accurate than the optimal solution arrived at using the layouts of FIGS. 1 and 2.

Figure 4:
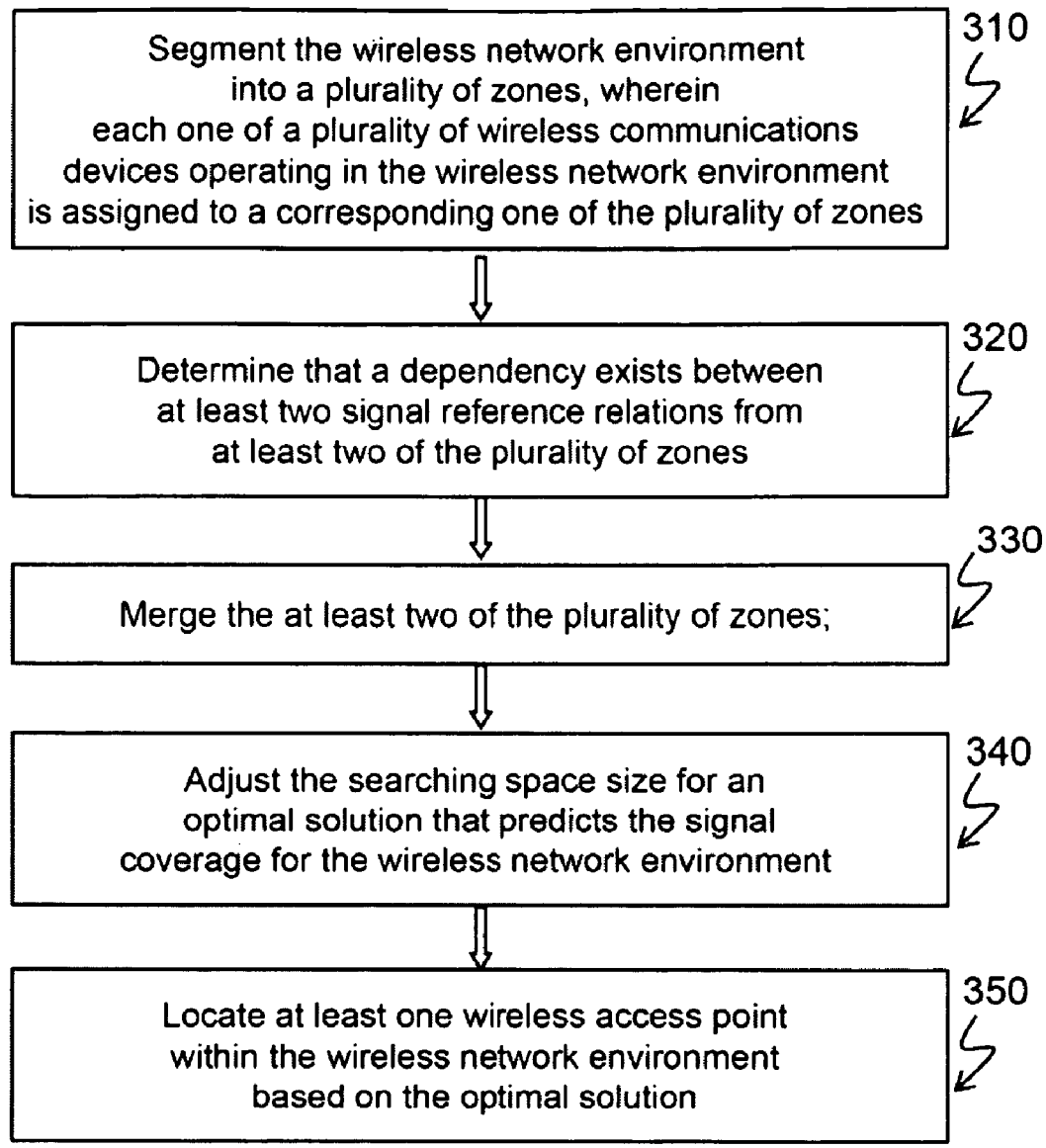
FIG. 4 is a flowchart for a computer implemented method for determining an optimal location for a wireless access points in a wireless network according to an embodiment of the invention.

FIG. 4 is a flowchart for a computer implemented method for determining an optimal location for a wireless access point in a wireless network according to an embodiment of the invention. The method of FIG. 4 begins at step 310 in which the wireless network environment is segmented into a plurality of zones. In step 310 each one of the wireless communications devices operating in the wireless network environment is assigned to a corresponding one of the zones. The method continues at step 320, in which a determination is made that a dependency exists between at least two signal reference relations from at least two of the zones.

At step 330, the two zones for which a dependency exists between the at least two signal reference relations are merged into a single zone. Step 340 includes adjusting the searching space size for the optimal solution that predicts the signal coverage for the wireless network environment. The method concludes with step 350 that includes locating at least one wireless access point with in the wireless network environment based on the optimal solution.

In conclusion, while the present invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A computer-implemented method for predicting signal coverage in a wireless network environment, comprising:
   segmenting the wireless network environment into a plurality of zones, wherein each one of a plurality of wireless communications devices operating in the wireless network environment is in a corresponding one of the plurality of zones;
   determining that a dependency exists between at least two signal reference relations from at least two of the plurality of zones by detecting that an obstacle is being shared by the at least two of the plurality of zones;
   merging the at least two of the plurality of zones;
   adjusting the searching space size for an optimal solution that predicts the signal coverage for the wireless network environment; and
   locating at least one wireless access point within the wireless network environment based on the optimal solution.

2. The method of claim 1, further comprising running a parameter optimization technique to find the optimal solution that predicts the signal coverage for the wireless network environment.

3. The method of claim 1, further comprising running a gradient search method to find the optimal solution that predicts the signal coverage for the wireless network environment.

4. The method of claim 1, wherein the optimal solution includes a path loss attenuation constant.

5. The method of claim 4, wherein the optimal solution includes a path loss constant for the obstacle.

6. The method of claim 4, wherein the optimal solution is compared with at least one measurement of signal strength of one of the plurality of wireless communications devices taken at a location within the wireless network environment.

7. An apparatus for predicting signal coverage in a wireless network, comprising:
   logic to arrange the wireless network into a plurality of zones, wherein each the zones includes at least one wireless communications device operating in the wireless network;
   logic to determine that a dependency exists between at least two signal reference relations from at least two of the plurality of zones, wherein the logic to determine that a dependency exists between at least two signal reference relations further comprises:
      logic to determine that a signal from a first wireless communications device passes through an obstacle before reaching a first signal measurement point; and
      logic to determine that a signal from a second wireless communications device passes through the obstacle prior to a second signal measurement point;
   logic to merge the at least two of the plurality of zones into a single cluster; and
   logic to adjust the searching space size for the optimal solution that predicts the signal coverage for a first portion of the wireless network based on the merging to merge the at least two of the plurality of zones into a single cluster.

8. The apparatus of claim 7, wherein the obstacle is one of the group consisting of a wall, a partition, a pillar, a door, and a window.

9. The apparatus of claim 7, further comprising logic for to combine the optimal solution that predicts the signal coverage for the first portion of the wireless network with a second optimal solution that predicts the signal coverage of a second portion of the wireless network.

10. The apparatus of claim 7, additionally comprising to perform performing a genetic algorithm to perform the optimal solution.

11. The apparatus of claim 7, wherein the logic to adjust the searching space size for the optimal solution increases the number of possible solutions when elements are added to a cluster.

12. The apparatus of claim 7, further comprising logic to calculate a mean and a variance for the points of a signal reference function.

13. A system for determining an optimal location for a wireless access point in a wireless network environment, comprising;
   logic to segment the wireless network into a plurality of zones, wherein each of the plurality of zones includes at least one wireless communications device operating in the wireless network;
   logic to merge at least two of the plurality of zones into a single cluster when a dependency exists between at least two signal reference relations from the at least two of the plurality of zones, wherein the dependency is determined by detecting that an obstacle is being shared by the at least two of the plurality of zones; and
   logic to adjust a searching space size, wherein the searching space size corresponds to a number of possible solutions, and wherein the searching space size is based on the merging at least two of the plurality of zones.

* * * * *

UNITED STATES PATENT AND TRADEMARK OFFICE
CERTIFICATE OF CORRECTION

| | | |
|---|---|---|
| PATENT NO. | : 8,208,454 B2 | |
| APPLICATION NO. | : 12/432584 | |
| DATED | : June 26, 2012 | |
| INVENTOR(S) | : Zuniga et al. | |

It is certified that error appears in the above-identified patent and that said Letters Patent is hereby corrected as shown below:

In the Claims

In column 5, line 56, in Claim 7, after "each" insert -- of --.

In column 6, line 23, in Claim 9, after "logic" delete "for".

In column 6, line 36, in Claim 12, after "variance for" delete "the".

Signed and Sealed this
Seventeenth Day of September, 2013

Teresa Stanek Rea
*Deputy Director of the United States Patent and Trademark Office*